US010733137B2

(12) United States Patent
Kachare et al.

(10) Patent No.: US 10,733,137 B2
(45) Date of Patent: Aug. 4, 2020

(54) LOW LATENCY DIRECT ACCESS BLOCK STORAGE IN NVME-OF ETHERNET SSD

(71) Applicant: Samsung Electronics Co., Ltd., Suwon-si, Gyeonggi-do (KR)

(72) Inventors: Ramdas P. Kachare, Cupertino, CA (US); Dong Gi Lee, Yongin-Si (KR); Ajay Sundar Raj, San Jose, CA (US); Fred Worley, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 15/655,738

(22) Filed: Jul. 20, 2017

(65) Prior Publication Data

US 2018/0307650 A1    Oct. 25, 2018

Related U.S. Application Data

(60) Provisional application No. 62/489,991, filed on Apr. 25, 2017.

(51) Int. Cl.
*G06F 15/167* (2006.01)
*G06F 16/245* (2019.01)
*G06F 15/173* (2006.01)

(52) U.S. Cl.
CPC ...... *G06F 15/167* (2013.01); *G06F 15/17331* (2013.01); *G06F 16/24569* (2019.01)

(58) Field of Classification Search
CPC ............... G06F 15/163; G06F 15/167; G06F 15/17331; G06F 15/17306; G06F 16/24569

See application file for complete search history.

(56) References Cited

U.S. PATENT DOCUMENTS 7,580,406 B2 *  8/2009  Shah .................. H04L 67/1097
                                                    370/389
7,860,941 B1 * 12/2010  Wilson ................ H04L 49/358
                                                    709/217

(Continued)

FOREIGN PATENT DOCUMENTS

WO    WO 2016/182756 A1    11/2016
WO    WO 2016/196766 A2    12/2016

OTHER PUBLICATIONS

A Remote Direct Memory Access Protocol Specification, Network Working Group, Request for Comments: 5040, Oct. 2007. (Year: 2007).*

*Primary Examiner* — James R Shelehada
(74) *Attorney, Agent, or Firm* — Lewis Roca Rothgerber Christie LLP

(57) ABSTRACT

A method of low-latency direct data access to non-volatile flash memory in at least one NVMe-oF SSD device connected over Ethernet. The method includes transmitting, from a low-latency direct access (LL-DAX) block storage software layer at a host, a remote direct memory access (RDMA) write request to the flash memory. The RDMA write request includes data, a storage address, a length of a data transfer operation, and an operation code. The method also includes receiving, at the host, an RDMA level acknowledgement indicating that the data has been persisted to the flash memory. The method also includes transmitting, from the LL-DAX block storage software layer, an RDMA read request to the flash memory that includes a storage address, a length of a data transfer, and an operation code. The method also includes receiving, at the host, data packets from the flash memory corresponding to the RDMA read request.

19 Claims, 5 Drawing Sheets

(56) References Cited

U.S. PATENT DOCUMENTS

| | | | |
|---|---|---|---|
| 9,467,511 B2 | 10/2016 | Tamir et al. | |
| 9,483,431 B2* | 11/2016 | Bergsten | H04L 67/1097 |
| 9,529,773 B2 | 12/2016 | Hussain et al. | |
| 9,785,573 B2* | 10/2017 | Wood | G06F 16/00 |
| 10,063,638 B2* | 8/2018 | Huang | G06F 13/00 |
| 2002/0152327 A1* | 10/2002 | Kagan | G06F 13/1605 |
| | | | 709/250 |
| 2005/0091334 A1* | 4/2005 | Chen | G06F 9/546 |
| | | | 709/216 |
| 2009/0248994 A1* | 10/2009 | Zheng | G06F 9/5016 |
| | | | 711/151 |
| 2010/0312941 A1* | 12/2010 | Aloni | H04L 49/90 |
| | | | 710/310 |
| 2013/0086311 A1 | 4/2013 | Huang et al. | |
| 2013/0094356 A1* | 4/2013 | Keith | H04L 47/2433 |
| | | | 370/229 |
| 2014/0119380 A1* | 5/2014 | Bakhshi | H04L 12/46 |
| | | | 370/409 |
| 2014/0279941 A1* | 9/2014 | Atkisson | G06F 16/2365 |
| | | | 707/690 |
| 2015/0032835 A1* | 1/2015 | Sharp | G06F 15/167 |
| | | | 709/212 |
| 2015/0254003 A1 | 9/2015 | Lee et al. | |
| 2015/0254088 A1* | 9/2015 | Chou | G06F 9/45541 |
| | | | 709/212 |
| 2016/0085718 A1* | 3/2016 | Huang | H04L 29/08 |
| | | | 709/213 |
| 2016/0127492 A1 | 5/2016 | Malwankar et al. | |
| 2016/0170659 A1* | 6/2016 | Golander | G06F 16/13 |
| | | | 711/158 |
| 2016/0188217 A1* | 6/2016 | Golander | G06F 3/065 |
| | | | 711/162 |
| 2016/0337272 A1* | 11/2016 | Berman | H04L 49/70 |
| 2016/0352831 A1 | 12/2016 | Totolos et al. | |
| 2016/0357698 A1 | 12/2016 | Huang | |
| 2017/0024334 A1* | 1/2017 | Bergsten | H04L 67/1097 |
| 2017/0149920 A1* | 5/2017 | Sammatshetti | H04L 67/2842 |
| 2017/0160980 A1* | 6/2017 | Golander | G06F 3/0673 |
| 2017/0168986 A1* | 6/2017 | Sajeepa | G06F 15/17331 |
| 2018/0004559 A1* | 1/2018 | Geml | G06F 9/45558 |
| 2018/0018090 A1* | 1/2018 | Lu | G06F 3/061 |
| 2018/0032249 A1* | 2/2018 | Makhervaks | G06F 3/061 |
| 2018/0048569 A1* | 2/2018 | Sajeepa | H04L 45/745 |
| 2018/0067685 A1* | 3/2018 | Deng | H04L 67/42 |
| 2018/0102978 A1* | 4/2018 | Shen | H04L 12/4633 |
| 2018/0129449 A1* | 5/2018 | Romem | G06F 3/0629 |
| 2018/0189204 A1* | 7/2018 | Sternberg | G06F 13/1673 |
| 2018/0239539 A1* | 8/2018 | He | G06F 3/0617 |
| 2018/0239540 A1* | 8/2018 | Kachare | G06F 3/0611 |
| 2018/0260125 A1* | 9/2018 | Botes | G06F 16/275 |
| 2018/0275905 A1* | 9/2018 | Olarig | G06F 13/4282 |
| 2018/0284990 A1* | 10/2018 | Kachare | G06F 3/0605 |
| 2018/0285019 A1* | 10/2018 | Olarig | H04L 41/0806 |
| 2018/0285024 A1* | 10/2018 | Coleman | G06F 3/061 |
| 2018/0307650 A1* | 10/2018 | Kachare | G06F 15/167 |
| 2018/0337991 A1* | 11/2018 | Kumar | H04L 41/0803 |
| 2019/0026038 A1* | 1/2019 | Voigt | G06F 3/0656 |
| 2019/0034103 A1* | 1/2019 | Voigt | G06F 3/0688 |
| 2019/0087352 A1 | 3/2019 | Lee | G06F 12/1018 |
| 2019/0102093 A1* | 4/2019 | Parnell | G06F 11/3433 |
| 2019/0138457 A1* | 5/2019 | Kumar | G06F 3/067 |

\* cited by examiner

LOW LATENCY DIRECT ACCESS BLOCK STORAGE IN NVME-OF ETHERNET SSD

CROSS-REFERENCE TO RELATED APPLICATION

This application claims priority to and the benefit of U.S. Provisional Application No. 62/489,991, filed Apr. 25, 2017, entitled "Method for Low Latency Direct Access Block Storage in NVMe-oF Ethernet SSD," the entire content of which is incorporated herein by reference.

FIELD

The present disclosure relates generally to data access methods and systems for solid-state drives.

BACKGROUND

Solid-state drives (SSD) are rapidly becoming the main storage elements of modern IT infrastructures, replacing traditional Hard Disk Drives (HDD). SSDs offer very low latency, high data read/write throughput, and reliable storage of user data. Non-volatile memory express over fabric (NVMe-oF) is an emerging technology that allows hundreds or even thousands of non-volatile memory express (NVMe) SSDs to be connected over Ethernet. The NVMe-oF protocol enables remote Direct Attach Storage (rDAS) implementation. This allows a large number of SSDs to be connected to the remote host. The NVMe-oF protocol uses a remote direct memory access (RDMA) protocol to provide reliable transport service to carry NVMe commands, data, and responses. Internet wide area RDMA protocol (iWARP), RDMA over converged Ethernet (RoCE) v1, and RoCE v2 are some of the transport protocols providing RDMA services.

FIG. 1 depicts an example of system architecture used in conventional NVMe-oF Ethernet SSD storage. As illustrated in FIG. 1, applications running on servers typically access storage through a system software stack. A typical storage system software stack includes many layers, such as Application(s), an Operating System (OS)/File System (FS), NVMe-oF drivers, a Block Storage layer (not shown in FIG. 1), and an RDMA transport layer (not shown in FIG. 1). These numerous layers of the system software can potentially add a large amount of latency to the data access by the applications. Due to advances in storage media technology (e.g., Z-NAND) and networking technology (e.g., 100 Gbps Ethernet), latency contribution due to media and network is significantly dropping. Accordingly, system software latency is becoming a significant component of overall data access latency.

The above information disclosed in this Background section is provided for enhancement of understanding of the background of the invention, and therefore, it may contain information that does not constitute prior art.

SUMMARY

The present disclosure is directed to various methods of low-latency direct data access to at least one non-volatile flash memory in non-volatile memory express (NVMe) solid-state drive (SSD) device connected over Ethernet. In one embodiment, the method includes transmitting, from a low-latency direct access (LL-DAX) block storage software layer at a host, a remote direct memory access (RDMA) write request to the flash memory. The RDMA write request includes data, a storage address, a length of a data transfer operation, and an operation code. The method also includes receiving, at the host, an acknowledgement indicating that the data has been persisted to the flash memory. The method further includes transmitting, from the LL-DAX block storage software layer, an RDMA read request to the flash memory. The RDMA read request includes a storage address, a length of a data transfer, and an operation code. The method also includes receiving, at the host, data packets from the flash memory corresponding to the RDMA read request.

The storage address, the length of the data transfer, and the operation code of the RDMA write request and the RDMA read request may be carried in RDMA header fields.

The method may also include transmitting an RDMA write request and an RDMA read request from the host to the flash memory with non-volatile memory express over fabric (NVMe-oF) protocol.

Transmitting the RDMA write request and transmitting the RDMA read request may include transmitting with a series of RDMA queue pairs (QPs). The method may also include performing arbitration, with LL-DAX host interface (HIF) logic, when two or more RDMA QPs have host commands. The arbitration selects one of the host commands for execution. A first RDMA QP of the series of RDMA QPs may dedicated to a first command and a second RDMA QP of the series of RDMA QPs may be dedicated to a second command different than the first command. The first command may be a write command and the second command may be a read command.

The method may also include transmitting, from the LL-DAX block storage software layer at the host, an Identify command to the flash memory. The flash memory, in response to the Identify command, transmits information about the flash memory to the host. The information may include supported features, capabilities, and characteristics of the flash memory. The Identify command may be transmitted with the RDMA read request.

The method may also include transmitting, from the LL-DAX block storage software layer at the host, a Delete command to the flash memory. The Delete command includes a starting block address and an ending block address of a range of block addresses. The Delete command may be transmitted with the RDMA write request.

The RDMA read and the RDMA write requests may be transported with an RDMA transport protocol such as RoCE v1, RoCE v2, or iWARP.

The LL-DAX block storage software layer may include a timeout value and the LL-DAX QPs may include a receive buffer configured to prevent a timeout during the transmitting of the RDMA write request.

LL-DAX storage capacity of the flash memory may be shared with NVMe-oF Namespaces.

The present disclosure is also directed to various embodiments of a system for low-latency direct data access to non-volatile flash memory. In one embodiment, the system includes at least one non-volatile memory express over Fabric (NVMe-oF) solid-state drive (SSD) device, which include flash memory, connected over Ethernet, and a host device including a processor and a low-latency direct access (LL-DAX) block storage software layer. The LL-DAX block storage software layer includes instructions stored therein, which, when executed by the processor, cause the processor to transmit a remote direct memory access (RDMA) write request to the flash memory including data, a storage address, a length of a data transfer operation, and an operation code, receive an acknowledgement indicating that the data has been persisted to the flash memory, transmit an RDMA read request to the flash memory including a storage address, a length of a data transfer, and an operation code, and receive data packets from the flash memory corresponding to the RDMA read request.

The host device may include instructions which, when executed by the processor, cause the processor to transmit an RDMA write request or an RDMA read request to the flash memory with a non-volatile memory express over fabric (NVMe-oF) protocol. The NVMe-oF protocol mode and the LL-DAX mode may be operated exclusively or together at the same time.

The NVMe SSD devices may include LL-DAX host interface (HIF) logic configured to arbitrate between host commands in two or more RDMA queue pairs (QPs). A first RDMA QP of the two or more RDMA RDMA QPs may be dedicated to a first command and a second RDMA QP of the two or more RDMA RDMA QPs may be dedicated to a second command different than the first command.

The LL-DAX block storage software layer may include a timeout value and the at least one NVMe SSD device may include a receive buffer configured to prevent a timeout during transmittance of the RDMA write request.

The instructions stored in the LL-DAX block storage software layer, when executed by the processor, may also cause the processor to transmit an identify command to the flash memory or a delete command to the flash memory.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
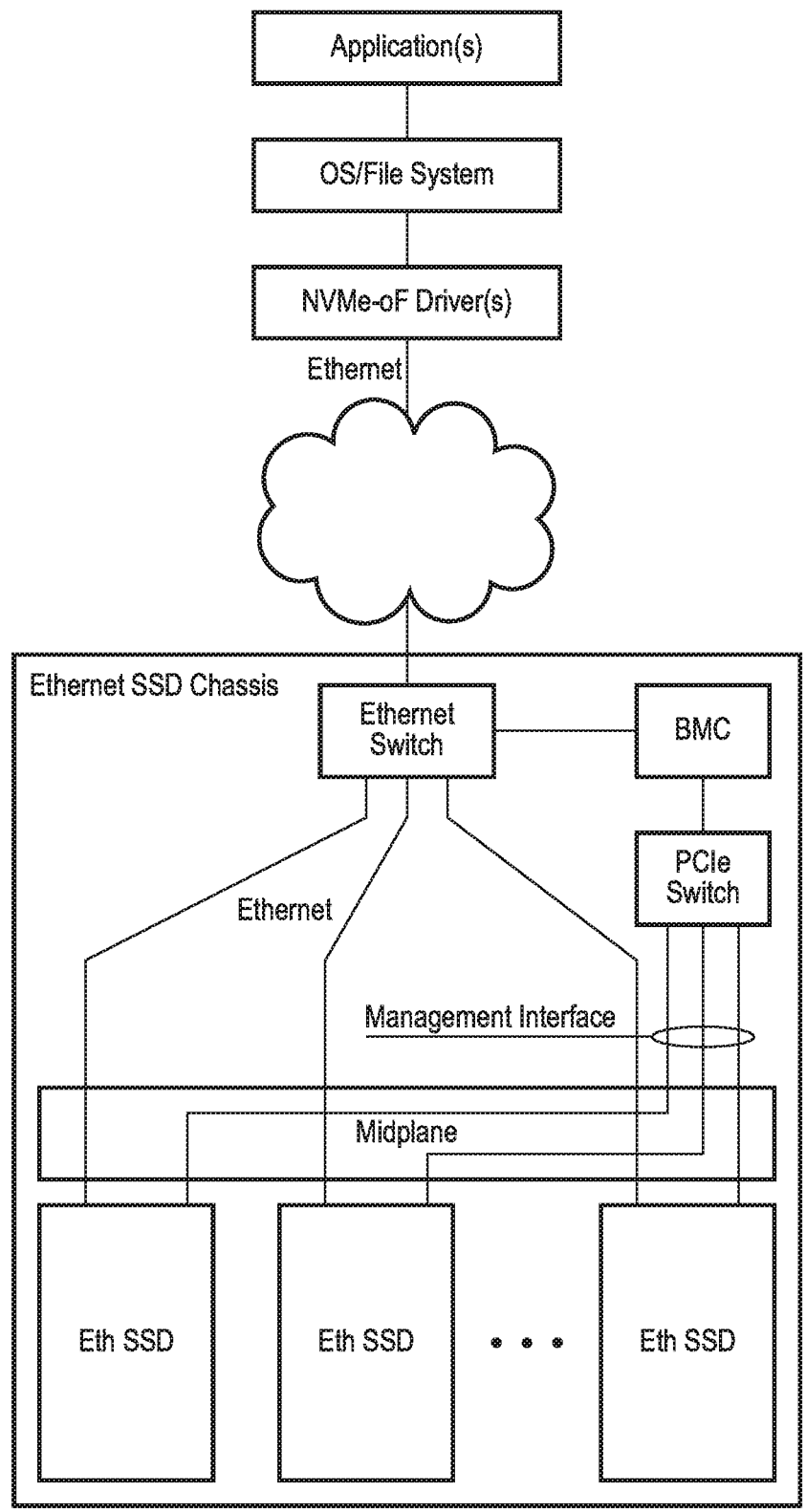
FIG. 1 is a schematic diagram depicting conventional system architecture utilized in non-volatile memory express over fabric (NVMe-oF) Ethernet SSD storage.

The present disclosure is directed to various systems and methods for low-latency data access in a non-volatile memory express over fabric (NVMe-oF) Ethernet SSD storage. The various systems and methods of the present disclosure utilize an LL-DAX protocol, an LL-DAX enabled eSSD, and LL-DAX Block Storage software. The various systems and methods for low latency access to the data storage are configured to achieve both high performance and a cost-effective solution. The various systems and methods of the present disclosure are configured to bypass some of the storage software stack layers utilized in conventional data access methods to provide lower latency and reduce the complexity and cost of existing storage software stacks. Additionally, the various systems and methods of the present disclosure do not require any additional intervening storage hardware infrastructure (i.e., the various systems and methods of the present disclosure do not impose any new hardware requirements for the storage infrastructure, and therefore these systems and methods do not impact any installed hardware infrastructure).

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

LL-DAX eSSD Protocol

Figure 2:
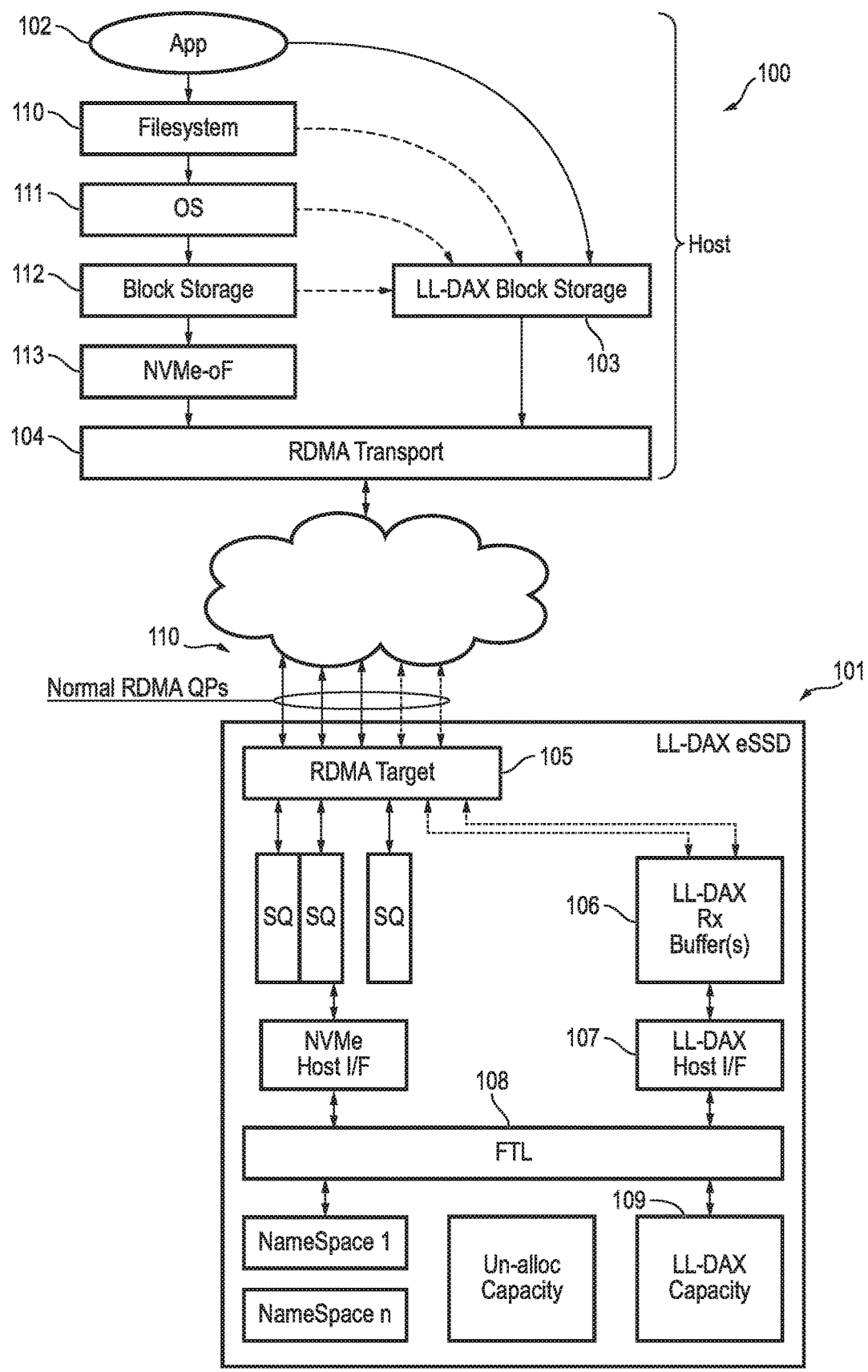
FIG. 2 is a schematic diagram depicting system architecture utilized in NVMe-oF Ethernet SSD storage according to one embodiment of the present disclosure.

With reference now to FIG. 2, an LL-DAX storage and data access system according to one embodiment of the present disclosure includes a host device 100 and an LL-DAX eSSD 101 (i.e., a series of NVMe SSD devices connected over Ethernet). The LL-DAX eSSD is a standard NVMe-oF eSSD, with additional LL-DAX feature support. The host device 100 includes an application 102, LL-DAX block storage software 103, and an RDMA transport layer 104. In the illustrated embodiment, the LL-DAX eSSD 101 includes an RDMA target layer 105, an LL-DAX receive buffer 106 connected to the RDMA target layer 105, an LL-DAX host interface (I/F) 107 connected to the LL-DAX receive buffer 106, a flash translation layer (FTL) 108 connected to the LL-DAX host interface (I/F) 107, and LL-DAX storage 109 connected to the FTL 108. As described in more detail below, the LL-DAX block storage software 103 in the host device 100 utilizes an LL-DAX protocol to send host commands (e.g., RDMA READ and RDMA WRITE commands) to the RDMA target 105 in the LL-DAX eSSD 101 to obtain low-latency direct access to data stored in the LL-DAX storage 109 (e.g., the LL-DAX block storage software 103 provides storage service to the application 102 or other system software layers at the host 100 and utilizes RDMA READ and RDMA WRITE requests to transfer data to and from the LL-DAX storage in the LL-DAX eSSDs). In this manner, the system of the present disclosure is configured to bypass a file system layer 110, an operating system (OS) layer 111, a block storage layer 112, and an NVMe-oF layer 113 of the host device 100 and obtain low-latency direct access to the data stored in the LL-DAX storage 109 of the LL-DAX eSSD 101.

Additionally, in one or more embodiments, the LL-DAX eSSD 101 can also operate as a standards compliant NVMe-oF Ethernet SSD. The LL-DAX data access mode is an optional feature. Accordingly, applications can utilize either standard block storage mode or the LL-DAX mode, as desired. Additionally, in one or more embodiments, the LL-DAX eSSD 101 may support both access modes (i.e., LL-DAX and NVMe-oF) at the same time.

The LL-DAX Protocol uses remote direct memory access (RDMA) transport including RDMA READ and RDMA WRITE requests to perform data transfers (i.e., LL-DAX WRITE and LL-DAX READ commands are utilized for data access). RDMA READ requests are utilized to retrieve or fetch data from the eSSD 101. RDMA WRITE requests are utilized to transfer data from the host 100 to the eSSD 101. As shown in Table 1 below, each RDMA READ and RDMA WRITE request includes an opcode (OPC) field, an address (ADDR) field, and a length (LEN) field pertaining to the LL-DAX storage.

TABLE 1

| Field Name | M/O | Width (bits) | Description |
| --- | --- | --- | --- |
| Opcode (OPC) | M | 8 | Instruction for the eSSD |
| Address (ADDR) | M | 64 | Storage location, block address |
| Length (LEN) | M | 64 | Length of the transfer, in the units of Block Size |

Figure 3:
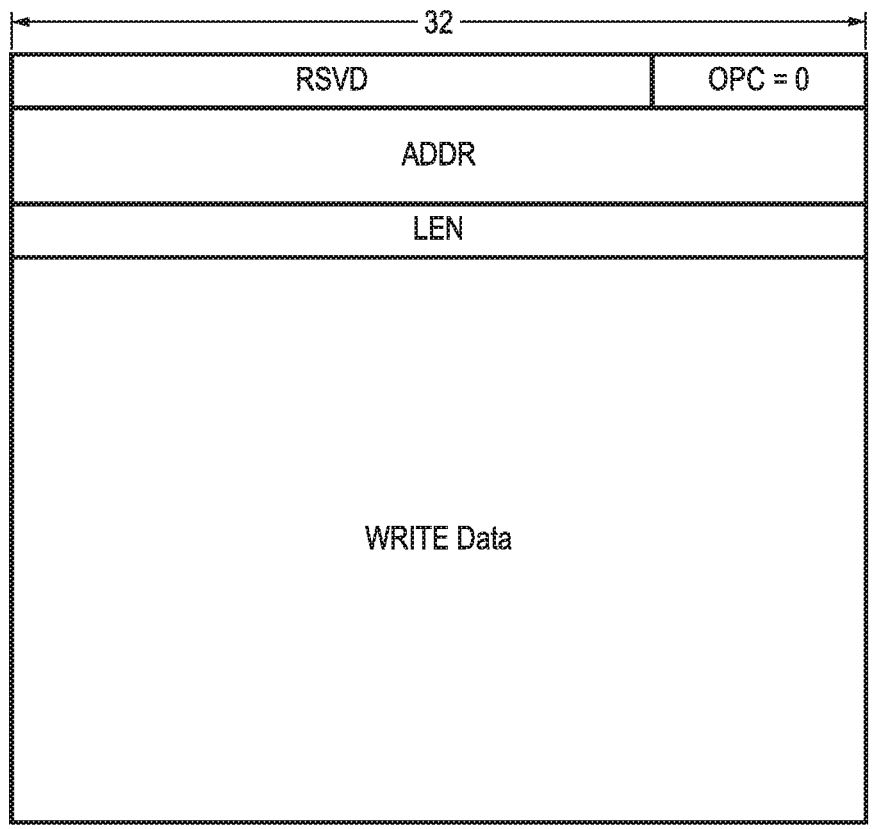
FIG. 3 is a diagram depicting the format of an LL-DAX WRITE command.
Figure 4:
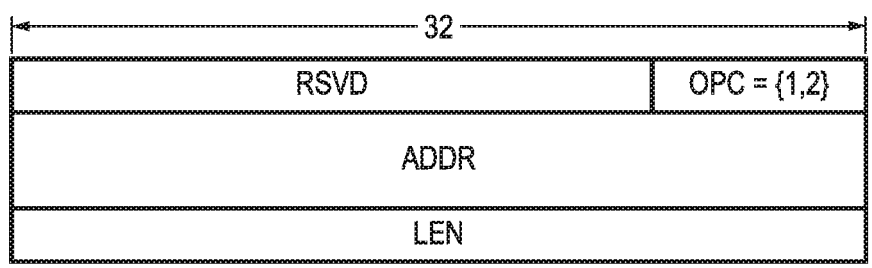
FIG. 4 is a diagram depicting the format of LL-DAX READ and LL-DAX IDENTIFY commands.

Table 2 below shows a command set (i.e., a set of encodings), including a set of mandatory (M) commands and a set of optional (O) commands, for the opcode (OPC) field of the RDMA WRITE request and/or the RDMA READ request according to one embodiment of the present disclosure. FIG. 3 is a diagram depicting the format of the LL-DAX WRITE command, and FIG. 4 is a diagram depicting the format of the LL-DAX READ command.

TABLE 2

| OPC Value (8-bit) | M/O | Encoding |
| --- | --- | --- |
| 0 | M | LL-DAX Host Write |
| 1 | M | LL-DAX Host Read |
| 2 | M | LL-DAX Identify |
| 3 | O | LL-DAX Delete |
| 4-255 | NA | RSVD |

The above-referenced LL-DAX command fields (i.e., opcode (OPC), address (ADDR), and length (LEN)) are carried in existing RDMA header fields. That is, the existing RDMA header fields typically used for remote buffer details are repurposed to carry the LL-DAX command fields (i.e., opcode (OPC), address (ADDR), and length (LEN)). There are multiple RDMA transport protocols, such as Internet wide area RDMA protocol (iWARP), RDMA over converged Ethernet (RoCE) v1, and RoCE v2, so the actual field names repurposed for LL-DAX usage may vary depending on the RDMA transport protocols.

Table 3 below shows one possible mapping for RoCE v1 and RoCE v2 requests.

TABLE 3

| LL-DAX Field Name | READ/WRITE |
|---|---|
| OPC | RETH.R-Key[7:0] |
| ADDR | RETH.VA[63:0] |
| LEN | RETH.DMALen[31:0] |

Table 4 below shows one possible mapping for iWARP requests.

TABLE 4

| LL-DAX Field Name | READ | WRITE |
|---|---|---|
| OPC | RDMAP.SrcSTag[7:0] | DDP.Sink STag[7:0] |
| ADDR | RDMAP.SrcTO[63:0] | DDP.Sink Tagged Offset[63:0] |
| LEN | RDMAP.RDMARDSZ[31:0] | |

The LL-DAX Protocol also utilizes an LL-DAX IDENTIFY command to fetch a 4 KB data structure from the eSSD 101. In response to receiving the LL-DAX IDENTIFY command, the eSSD 101 reports information about the LL-DAX storage 109, such as its supported features, capabilities, and characteristics. The format of the LL-DAX IDENTIFY command, which is identical to the format of the LL-DAX READ command, is depicted in FIG. 4. Table 5 below identifies the information about the LL-DAX storage 109 reported in response to the LL-DAX IDENTIFY command, including the LL-DAX storage capacity (e.g., 1 TB) reserved for access by the RDMA READ and WRITE commands, the receive buffer size present on the eSSD 101, the maximum RDMA WRITE size supported by the eSSD 101, and the block size. In one or more embodiments, the LL-DAX storage capacity 109 may be dedicated storage capacity inside the eSSD 101 for LL-DAX applications and users. In one or more embodiments, LL-DAX and non-LL-DAX applications can share the same storage capacity inside the eSSD 101 through the file system or other system stack layers (e.g., the LL-DAX and non-LL-DAX applications may exchange data with each other). Sharing storage space between LL-DAX applications and legacy non-LL-DAX applications may also be achieved at the SSD controller level. For instance, in one or more embodiments, the LL-DAX storage capacity 109 may be shared with NVMe-oF Namespaces. In one or more embodiments in which the LL-DAX storage capacity 109 shared with NVMe-oF Namespaces, access coordination is performed at higher levels of the host software.

TABLE 5

| Field Name | M/O | Width (bits) | Description |
|---|---|---|---|
| Capacity | M | 128 | LL-DAX capacity, in bytes. |
| Receive Buffer Size | M | 32 | Receive buffer size present on the eSSD for LL-DAX, in KB. |
| Max WRITE Size | M | 32 | Max size of the RDMA WRITE capsule supported, in KB. |
| Block Size | M | 32 | Block size, in bytes. |
| RSVD | M | 4K-28 Bytes | Remaining space reserved for future use. |

Figure 5:
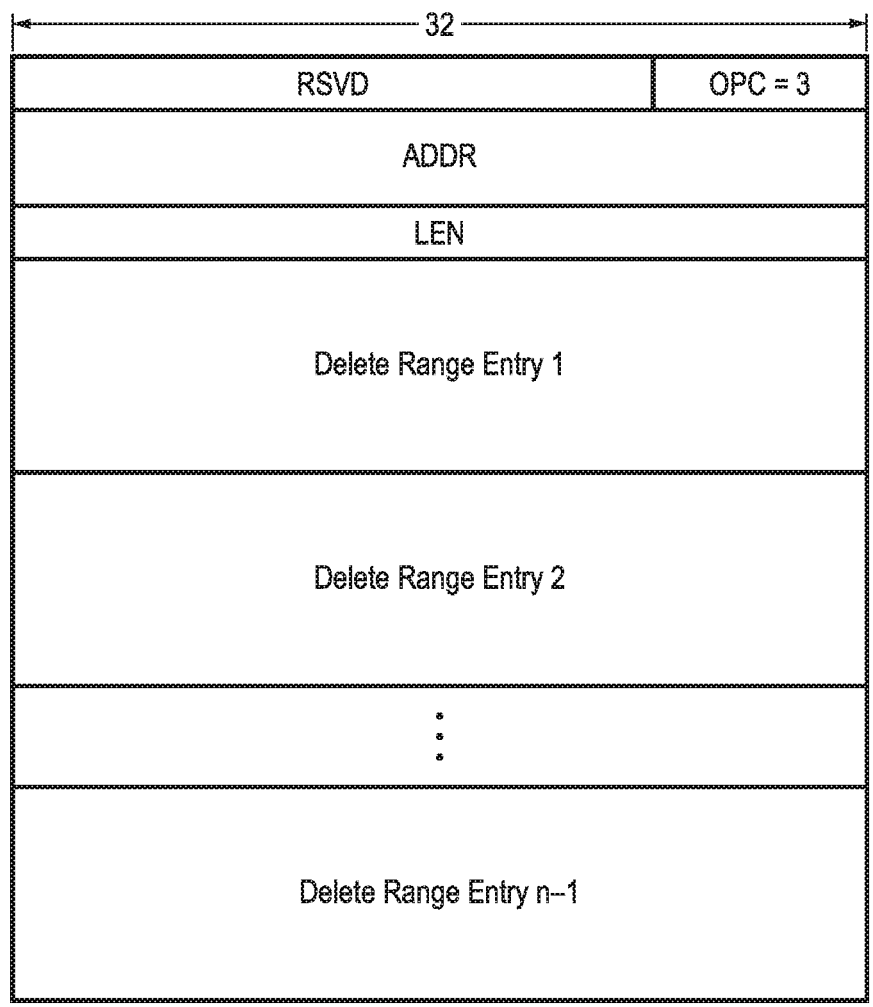
FIG. 5 is a diagram depicting the format of an LL-DAX DELETE command.

The LL-DAX Protocol optionally utilizes an LL-DAX DELETE command. The LL-DAX DELETE command carries one or more delete address range entries. Each delete range entry is a 16 Byte data structure containing a start block address and an end block address of the delete range entry. FIG. 5 is a diagram depicting the format of an LL-DAX DELETE command. Table 6 below depicts the format of the delete range entry.

TABLE 6

| Field Name | M/O | Width (bits) | Description |
|---|---|---|---|
| Start Address | M | 64 | Starting block address of the range |
| End Address | M | 64 | Ending block address of the range |

The command set for the LL-DAX Protocol is extensible and additional commands may be added to the LL-DAX Protocol, such as, for instance, Control and Status Register (CSR) access and Health log.

A method of low-latency data access to flash memory in NVMe SSD devices connected over Ethernet according to one embodiment of the present disclosure includes a task of transmitting, from the LL-DAX block storage software layer 103 at the host 100, an RDMA WRITE request to the flash memory including data, a storage address, a length of a data transfer operation, and an operation code. The RDMA WRITE request persists the data to the flash memory at the identified storage address. The method also includes a task of transmitting, from the LL-DAX block storage software layer, an RDMA READ request to the flash memory including a storage address, a length of a data transfer, and an operation code. The RDMA READ request retrieves data located at the specified storage address of the flash memory. The storage address, the length of the data transfer, and the operation code of the RDMA WRITE request and the RDMA READ request are carried in RDMA header fields. The method may also include a task of transmitting, from the LL-DAX block storage software layer at the host, an LL-DAX IDENTIFY command to the flash memory to obtain information about the flash memory, such as its supported features, capabilities, and characteristics. The LL-DAX IDENTIFY is transmitted with the RDMA READ request. The method may also include a task of transmitting, from the LL-DAX block storage software layer at the host, a DELETE command to the flash memory to delete data persisted on the flash memory at one or more specified address ranges. The DELETE command is transmitted with the RDMA write request.

LL-DAX eSSD Operation

With reference again to FIG. 2, LL-DAX is an optional feature in a standard NVMe-oF Ethernet SSD because eSSD supports an embedded RDMA network interface. NVMe-oF protocol utilizes RDMA queue pairs (QPs) to transport commands, data, and completions. An NVMe-oF host driver utilizes RDMA SEND requests to send commands to the eSSD. The eSSD utilizes RDMA READ and RDMA WRITE requests for data transfers. The eSSD also utilizes RDMA SEND requests to post completions (e.g., acknowledgements of data persistence) to the host.

LL-DAX utilizes the same RDMA interface present in the eSSD 101. LL-DAX utilizes one or more separate and dedicated queue pairs (QPs) 110 for LL-DAX access. The LL-DAX host uses RDMA READ and RDMA WRITE requests to perform data transfers and to send commands to the eSSD 101. The eSSD 101 only responds to the RDMA requests (e.g., RDMA READ and RDMA WRITE requests) of the LL-DAX host and does not initiate any RDMA requests on its own. The RDMA acknowledgements work as data transfers completions and there are no separate completions as opposed to completions in NVMe-oF. That is, NVMe-oF has explicit command completions, whereas LL-DAX does not have such explicit completions. Instead, LL-DAX uses the RDMA level acknowledgements for that purpose. In one or more embodiments, the NVMe-oF protocol mode and the LL-DAX mode may be operated exclusively or together at the same time (e.g., the eSSD supports both the NVMe-oF protocol mode and the LL-DAX protocol mode such that the NVMe-oF mode of operation can co-exist with LL-DAX mode of operation).

Figure 6:
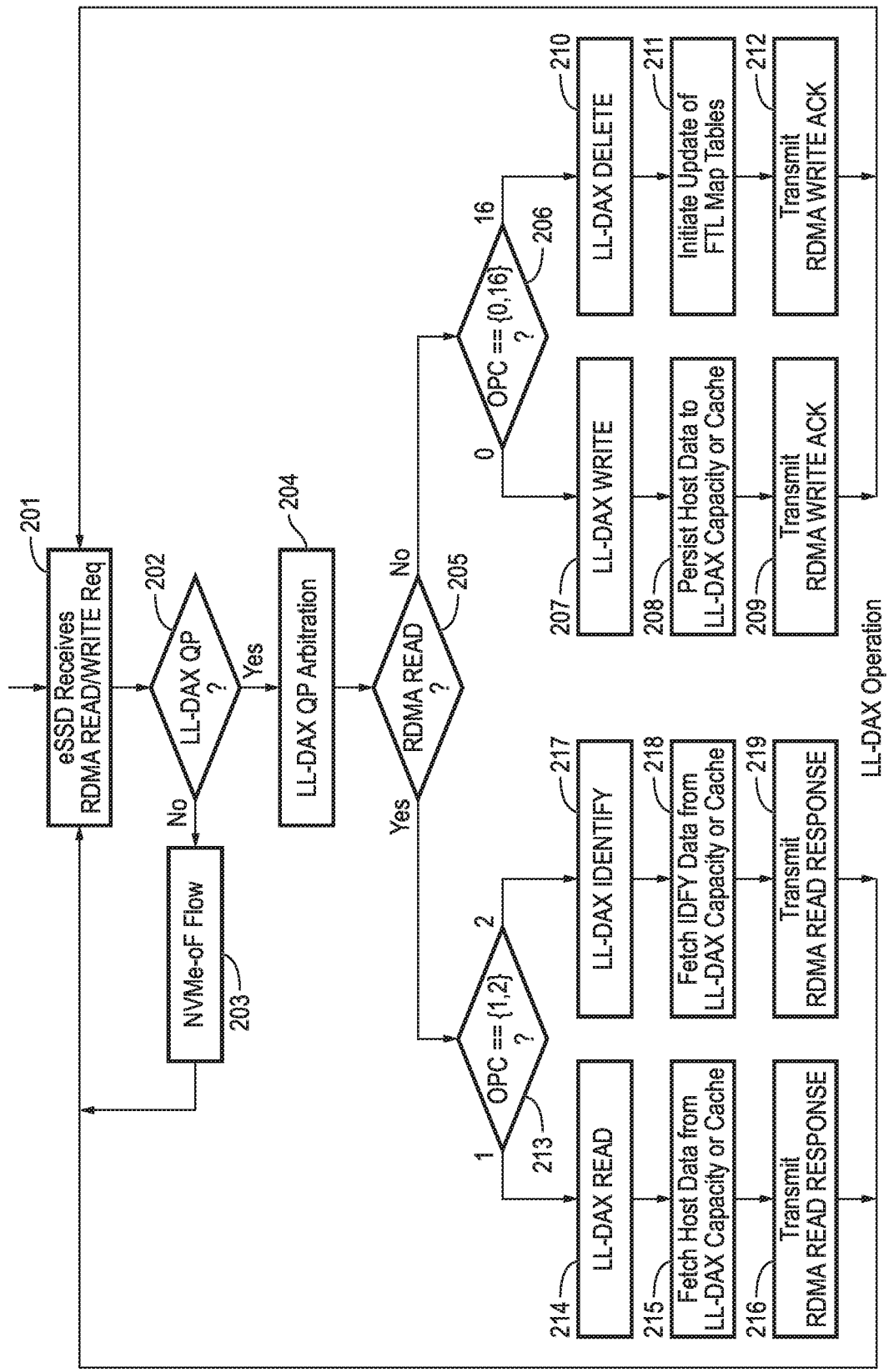
FIG. 6 is a flowchart of an LL-DAX operation in an eSSD according to one embodiment of the present disclosure.

FIG. 6 is a flowchart depicting the LL-DAX operation in an eSSD according to one embodiment of the present disclosure. As illustrated in FIG. 6, at operation 201, the eSSD receives an RDMA READ request or an RDMA WRITE request from the LL-DAX block storage software layer 103 (see FIG. 2) at the host device. At operation 202, it is determined whether the RDMA READ request or the RDMA WRITE request is on the LL-DAX QP. When the eSSD receives an RDMA READ or RDMA WRITE request that is not on the LL-DAX QP, the RDMA READ or RDMA WRITE command follows the standard NVME-oF protocol for accessing the eSSD, as shown at operation 203. When the eSSD receives an RDMA READ or RDMA WRITE request on the LL-DAX QP from the LL-DAX block storage software layer 103 at the host device, the RDMA request is forwarded to the LL-DAX host interface (HIF) logic 107 (see FIG. 2). At operation 204, when two or more LL-DAX QPs 110 have host commands, LL-DAX HIF logic 107 performs arbitration between those LL-DAX QPs 110 to select one of the host commands for execution. The arbitration performed by the LL-DAX HIF logic 107 could be, for example, a simple round-robin arbitration or a more complex arbitration scheme implemented with host controlled settings. In one or more embodiments, different LL-DAX QPs 110 may be used to differentiate execution between different commands. For example, one LL-DAX QP 110 may be utilized to send only write commands (e.g., one LL-DAX QP 110 may be dedicated to sending write commands exclusively) while another LL-DAX QP 110 may be utilized to send only read commands (e.g., one LL-DAX QP 110 may be dedicated to sending read commands exclusively). The LL-DAX HIF logic 107 parses the selected command and extracts opcode, as well as other relevant LL-DAX fields, from the RDMA command. The LL-DAX HIF logic 107 then executes the received LL-DAX command and acknowledges the RDMA request packet to the host. In one or more embodiments, there are no separate command completions. The RDMA request packet acknowledgements serve as completions of the commands.

With continued reference to FIG. 6, at operation 205, the LL-DAX HIF logic 107 (see FIG. 2) determines whether the host command is an RDMA READ request or an RDMA WRITE request. If the host command is determined to be an RDMA WRITE command, at operation 206 the LL-DAX HIF logic 107 determines whether the RDMA WRITE command is an LL-DAX WRITE command or an LL-DAX DELETE command (which is transmitted with the RDMA WRITE command) by inspecting the opcode value of the host command. At operation 207, when the LL-DAX HIF logic 107 determines that the host command is an LL-DAX WRITE command (e.g., when the opcode value of the command is 0), the LL-DAX HIF logic 107 first persists the received data to the flash media (e.g., LL-DAX capacity 109, as shown in FIG. 2) or cache at operation 208 and then the LL-DAX HIF logic 107 acknowledges the RDMA WRITE at operation 209 (e.g., an acknowledgement of the LL-DAX WRITE command is transmitted to the host by the LL-DAX HIF logic 107. If the eSSD has a power-loss protected buffer, received write data could be written to cache and then the RDMA WRITE packet may be acknowledged.

To prevent an RDMA WRITE timeout on the host side due to the duration of the data persistence, the host RDMA stack may be programmed with sufficiently large timeout values. Additionally, the LL-DAX QP receive buffer 106 (see FIG. 2) needs to be sized appropriately to allow some amount of write bursts due to the duration of the data persistence. Absorption of the write bursts when an eSSD flash transition layer (FTL) layer is busy and cannot drain the receive buffer would provide better performance to the host. For example, in one or more embodiments, a receive buffer of 50 MB would allow a 10 ms burst at 40 Gbps speed to be absorbed without backpressure to the host. The backpressure mechanism used is standard RDMA NACK packets.

As illustrated in FIG. 6, the LL-DAX DELETE command is transported using the RDMA WRITE request. At operation 210, when the LL-DAX HIF logic 107 determines that the host command is an LL-DAX DELETE command (e.g., when the opcode value of the command is 16), the LL-DAX HIF logic 107 first initiates an update of the flash translation layer (FTL) map tables at operation 211 and then the LL-DAX HIF logic 107 acknowledges the RDMA WRITE packet at operation 212 (e.g., an acknowledgement of the LL-DAX WRITE command, which is utilized to transport the LL-DAX DELETE command, is transmitted to the host by the LL-DAX HIF logic 107 at operation 212). The payload of the RDMA WRITE request, which is utilized to transport the LL-DAX DELETE command, carries one or more block address ranges that are deleted or de-allocated by the applications, as depicted in FIG. 6. De-allocated address information is utilized by eSSD for flash media management.

With continued reference to FIG. 6, when the LL-DAX HIF logic 107 determines at operation 205 that the host command is an RDMA READ command, at operation 206 the LL-DAX HIF logic 107 then determines at operation 213 whether the RDMA READ command is an LL-DAX READ command or an LL-DAX IDENTIFY command (which is transmitted with the RDMA READ command) by inspecting the opcode value of the host command. At operation 214, when the LL-DAX HIF logic 107 determines that the host command is an LL-DAX READ command (e.g., when the opcode value of the command is 1), the LL-DAX HIF logic 107 first fetches the requested data from the flash media (e.g., LL-DAX capacity 109) or from the cache at operation 215 and then transmits the requested data to the host with RDMA READ RESPONSE packets at operation 216. In one or more embodiments, there may be multiple response packets depending upon network maximum transmission unit (MTU). The last RDMA READ RESPONSE packet acknowledges the LL-DAX READ command.

As illustrated in FIG. 6, the LL-DAX IDENTIFY command is transported using the RDMA READ request (i.e., the LL-DAX IDENTIFY command is received as part of the RDMA READ request). The LL-DAX IDENTIFY command has similar execution flow to the LL-DAX READ command. At operation 217, when the LL-DAX HIF logic 107 determines that the host command is an LL-DAX IDENTIFY command (e.g., when the opcode value of the command is 2), the LL-DAX HIF logic 107 first fetches the identify data structure from the flash media (e.g., LL-DAX capacity 109) or from the cache at operation 218 and then transfers the identify data structure to the host using RDMA READ RESPONSE packets at operation 219.

LL-DAX Block Storage Software Operation

With reference again to FIG. 2, the LL-DAX Block Storage software layer 103 provides storage access to the applications or to other system software layers. LL-DAX software 103 performs various functions related to the DAX storage, including discovery, application side interface, data transfers, and error handling.

Initially, the LL-DAX software 103 needs to discover the LL-DAX eSSD 101 and establish communication channels with the LL-DAX eSSD 101. A network address of the LL-DAX eSSD 101 could be provided to the LL-DAX software 103 in any suitable method, such as, for instance, a text file generated by a storage admin that contains the network address of the LL-DAX eSSD 101. Discovery service may be managed by the storage admin. Such discovery methods are commonly used in existing storage infrastructures.

Once the LL-DAX software 103 has discovered and established communication channels with the LL-DAX eSSD 101, the LL-DAX software 103 requests the RDMA transport layer 104 to establish a desired number of new queue pairs (QPs) 110 to the LL-DAX eSSD 101. Once one or more QPs 110 are established, the LL-DAX software 103 issues an LL-DAX IDENTIFY command using an RDMA READ request. The LL-DAX eSSD 101 responds to the LL-DAX IDENTIFY command by transferring information about the LL-DAX storage 109 (e.g., identifying parameters of the LL-DAX storage 109), such as the various capabilities, features, and characteristics of the LL-DAX storage 109. Accordingly, following the LL-DAX IDENTIFY command, the LL-DAX driver understands the various capabilities, features, and characteristics of the underlying LL-DAX storage 109, which is utilized during normal operation of the data storage.

LL-DAX software 103 provides an interface to the applications for accessing the LL-DAX storage 109. LL-DAX is a kernel module and it provides a Read/Write interface using input/output control (IOCTL) system call. The LL-DAX software 103 does not operate in the load store semantics. The LL-DAX driver is accessible to the applications using a device handle associated with the LL-DAX driver. Applications can issue read and write operations using this handle and LL-DAX storage addresses. These application requests are translated into the appropriate RDMA layer requests by the LL-DAX software 103. The RDMA requests are issued and tracked for completions by the LL-DAX software 103. When the requests complete, application calls are returned. When a data structure allocated in the LL-DAX capacity 109 is deleted or de-allocated, the LL-DAX software 103 converts those events into LL-DAX DELETE commands and sends these commands to the eSSD 101. LL-DAX DELETE commands are utilized for eSSDs to reduce garbage collection related to background operations in eSSD.

Additionally, the LL-DAX software 103 may implement some basic storage space management functions, similar to a file system. For example, in one or more embodiments, the LL-DAX software 103 could implement storage space allocation and de-allocation functions. In one or more embodiments, the LL-DAX software 103 may perform basic access controls for the applications using the LL-DAX storage 109. When an application needs a certain amount of storage, the application requests allocation of the desired amount of storage. The LL-DAX software 103 can maintain the allocation tables for the LL-DAX capacity 109. The LL-DAX software 103 allocates the requested storage space from the available space and returns a storage handle to that space to the requestor. The storage handle is then utilized by the applications for subsequent data read/write access. Additionally, in one or more embodiments, to provide more flexibility, data accessibility, and space management, the LL-DAX block storage software 103 may include file information translation functions. Accordingly, in one or more embodiments, an LL-DAX application can share its LL-DAX data with another application (e.g., a non-LL-DAX application).

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A method of low-latency direct data access (LL-DAX) to non-volatile flash memory in at least one non-volatile memory express over fabric (NVMe-oF) solid-state drive (SSD) device connected over Ethernet, the method comprising:

transmitting, from a LL-DAX block storage software layer at a host, a remote direct memory access (RDMA) write request to the flash memory with LL-DAX protocol, the RDMA write request comprising data, a storage address, a length of a data transfer operation, and an operation code;

transmitting, from a non-volatile memory express over fabric (NVMe-oF) layer at the host of the LL-DAX block storage software layer, an RDMA write request to the flash memory with NVMe-oF protocol simultaneously with the transmitting of the RDMA write request to the flash memory from the LL-DAX block storage software layer, wherein the RDMA write request with LL-DAX protocol and the RDMA write request with NVMe-oF protocol both originate from the host;

receiving, at the host, an RDMA level acknowledgement indicating that the data has been persisted to the flash memory;

transmitting, from the LL-DAX block storage software layer, an RDMA read request to the flash memory, the RDMA read request comprising a storage address, a length of a data transfer, and an operation code; and receiving, at the host, RDMA read response data packets from the flash memory corresponding to the RDMA read request.

2. The method of claim 1, wherein the storage address, the length of the data transfer, and the operation code of the RDMA write request and the storage address, the length of the data transfer, and the operation code of the RDMA read request are carried in respective RDMA header fields.

3. The method of claim 1, wherein the transmitting the RDMA write request comprises transmitting the RDMA write request with a plurality of RDMA queue pairs (QPs) and the transmitting the RDMA read request comprises transmitting the RDMA read request with a plurality of RDMA QPs.

4. The method of claim 3, wherein two or more RDMA QPs have host commands, and wherein the method further comprises performing arbitration, using an LL-DAX host interface (HIF) logic, the arbitration selecting one of the host commands for execution.

5. The method of claim 3, wherein a first RDMA QP of the plurality of RDMA QPs is associated with a first command and a second RDMA QP of the plurality of RDMA QPs is associated with a second command, and wherein the second command is different than the first command.

6. The method of claim 5, wherein the first command is a write command and the second command is a read command.

7. The method of claim 3, wherein the LL-DAX block storage software layer comprises a timeout value and the RDMA QPs comprise a receive buffer configured to prevent a timeout during the transmitting of the RDMA write request.

8. The method of claim 1, further comprising transmitting an identify command, from the LL-DAX block storage software layer at the host, to the flash memory, and wherein the flash memory, in response to the Identify command, transmits information about the flash memory to the host.

9. The method of claim 8, wherein the information comprises supported features, capabilities, and characteristics of the flash memory.

10. The method of claim 8, wherein the identify command is transmitted with the RDMA read request.

11. The method of claim 1, further comprising transmitting, from the LL-DAX block storage software layer at the host, a delete command to the flash memory, the delete command comprising a starting block address and an ending block address of a range of block addresses.

12. The method of claim 11, wherein the delete command is transmitted with the RDMA write request.

13. The method of claim 1, wherein the RDMA read request and the RDMA write request are transported with a transport protocol selected from the group of RDMA transport protocols consisting of RoCE v1, RoCE v2, and iWARP.

14. The method of claim 1, wherein LL-DAX storage capacity of the flash memory is shared with NVMe-oF namespaces.

15. A system for low-latency direct data access (LL-DAX) to non-volatile flash memory, the system comprising:

at least one non-volatile memory express (NVMe) solid-state drive (SSD) device connected over Ethernet, the at least one NVMe SSD device comprising the flash memory; and a host device comprising a processor, a non-volatile memory express over fabric (NVMe-oF) layer, and a LL-DAX block storage software layer, wherein the LL-DAX block storage software layer has instructions stored therein, which, when executed by the processor, cause the processor to:
  transmit a remote direct memory access (RDMA) write request to the flash memory with LL-DAX protocol, the RDMA write request comprising data, a storage address, a length of a data transfer operation, and an operation code;
  receive an acknowledgement indicating that the data has been persisted to the flash memory;
  transmit an RDMA read request to the flash memory, the RDMA read request comprising a storage address, a length of a data transfer, and an operation code; and
  receive data packets from the flash memory corresponding to the RDMA read request,
wherein the NVMe-oF layer has instructions stored therein, which, when executed by the processor, cause the processor to transmit an RDMA write request to the flash memory with NVMe-oF protocol simultaneously with the RDMA write request to the flash memory from the LL-DAX block storage software layer, and
wherein the RDMA write request with LL-DAX protocol and the RDMA write request with NVMe-oF protocol both originate from the host device.

16. The system of claim 15, wherein the NVMe SSD devices comprise LL-DAX host interface (HIF) logic configured to arbitrate between host commands in two or more RDMA queue pairs (QPs).

17. The system of claim 16, wherein a first RDMA QP of the two or more RDMA QPs is dedicated to a first command and a second RDMA QP of the two or more RDMA QPs is dedicated to a second command different than the first command.

18. The system of claim 15, wherein the LL-DAX block storage software layer comprises a timeout value and wherein the at least one NVMe SSD device comprises a receive buffer configured to prevent a timeout during transmittance of the RDMA write request.

19. The system of claim 15, wherein the instructions stored in the LL-DAX block storage software layer, when executed by the processor, cause the processor to transmit an identify command to the flash memory or a delete command to the flash memory.

* * * * *